United States Patent
Uesugi

(10) Patent No.: US 8,628,247 B2
(45) Date of Patent: Jan. 14, 2014

(54) BEARING STRUCTURE OF TURBOCHARGER

(75) Inventor: Tsuyoshi Uesugi, Kariya (JP)

(73) Assignee: Kabushiki Kaisha Toyota Jidoshokki, Aichi (JP)

(*) Notice: Subject to any disclaimer, the term of this patent is extended or adjusted under 35 U.S.C. 154(b) by 0 days.

(21) Appl. No.: 13/370,565

(22) Filed: Feb. 10, 2012

(65) Prior Publication Data
US 2012/0237149 A1   Sep. 20, 2012

(30) Foreign Application Priority Data
Mar. 17, 2011   (JP) .................. 2011-059585

(51) Int. Cl.
*F16C 33/10* (2006.01)
*F04B 17/00* (2006.01)

(52) U.S. Cl.
USPC ........................................ 384/397; 417/407

(58) Field of Classification Search
USPC ............... 384/119, 276, 281, 286–293, 294, 384/397–416, 99, 112, 113; 415/229; 417/407
See application file for complete search history.

(56) References Cited

U.S. PATENT DOCUMENTS

| | | | |
|---|---|---|---|
| 3,390,926 A * | 7/1968 | Woollenweber, Jr. | 384/287 |
| 4,370,106 A * | 1/1983 | Lauterbach | 417/407 |
| 5,169,242 A * | 12/1992 | Blase et al. | 384/99 |
| 6,017,184 A * | 1/2000 | Aguilar et al. | 415/112 |
| 6,056,509 A * | 5/2000 | Nakayama et al. | 416/128 |
| 2007/0003175 A1 * | 1/2007 | Petitjean et al. | 384/322 |
| 2010/0266230 A1 * | 10/2010 | Hong | 384/415 |
| 2011/0176907 A1 * | 7/2011 | Groves et al. | 415/1 |

FOREIGN PATENT DOCUMENTS

| | | | |
|---|---|---|---|
| DE | 20300912 | * | 3/2003 |
| DE | 10 2012 202 387 A1 | | 9/2012 |
| JP | 4-19917 U | | 2/1992 |
| JP | 2002213450 A | * | 7/2002 |
| JP | 3094869 | * | 7/2003 |
| JP | 2007-170296 A | | 7/2007 |
| JP | 2010-138757 A | | 6/2010 |

OTHER PUBLICATIONS

Machine Translation of JP 3094869.*
German Office Action dated May 2, 2013 issued in German Patent Application 10 2012 202 387.9.

* cited by examiner

*Primary Examiner* — Alan B Waits
(74) *Attorney, Agent, or Firm* — Sughrue Mion, PLLC

(57) ABSTRACT

A turbocharger is provided with a rotor shaft, a bearing housing in which a bearing hole is formed, and a bearing member of the semi-floating type arranged in the bearing hole and supporting the rotor shaft in a rotatable state. The bearing member has a first bearing portion and a second bearing portion spaced at a predetermined interval in the axial direction of the rotor shaft, in its inner periphery. A region between the first bearing portion and the second bearing portion in the inner periphery of the bearing member, and an outer periphery of the rotor shaft constitute an oil passage for supply of lubricant oil to inside surfaces of the first and second bearing portions. Oil grooves to suppress the whirl vibration are formed in each of the inside surfaces of the first and second bearing portions. The oil grooves are closed in part.

11 Claims, 5 Drawing Sheets

BEARING STRUCTURE OF TURBOCHARGER

BACKGROUND OF THE INVENTION

1. Field of the Invention

The present invention relates to a bearing structure of a turbocharger.

2. Related Background Art

Japanese Patent Applications Laid-open No. 2007-170296 and Laid-open No. 2010-138757 disclose turbocharger bearing structures provided with a rotor shaft, a bearing housing in which a bearing hole is formed, and a bearing member of the semi-floating type arranged in the bearing hole and supporting the rotor shaft in a rotatable state. In the turbocharger bearing structures described above, the bearing member has a first bearing portion and a second bearing portion spaced at a predetermined interval in the axial direction of the rotor shaft, in its inner periphery. The region between the first bearing portion and the second bearing portion in the inner periphery of the bearing member and the outer periphery of the rotor shaft constitute an oil passage for supply of lubricant oil to inside surfaces of the first and second bearing portions. A through hole for supply of the lubricant oil to the oil passage is formed in the bearing member. The lubricant oil supplied through a lubricant supply hole of the bearing housing is supplied through the through hole of the bearing member into the oil passage and then flows through the space between each of the inside surfaces of the first and second bearing portions and the rotor shaft to form oil film.

SUMMARY OF THE INVENTION

It is assumed in the case of the above-described conventional turbocharger bearing structures that with rotation of the rotor shaft, oil whirl vibration or oil whip vibration (which will be referred to hereinafter both as "whirl vibration") of the rotor shaft is induced by dynamic action of the oil film formed in the space between each of the inside surfaces of the first and second bearing portions and the rotor shaft. It can be contemplated that the spaces between the rotor shaft and the bearing portions are reduced, in order to suppress the whirl vibration. However, there is concern about seizure of the rotor shaft due to film disruption.

It can be contemplated that oil grooves are formed throughout the entire length in the axial direction of each inside surface of the first and second bearing portions, so as to reduce the whirl speed of oil film and thereby suppress the whirl vibration. However, in the case where the oil grooves are formed throughout the entire length in the axial direction of each inside surface of the first and second bearing portions, the whirl vibration can be suppressed, but the lubricant oil supplied into the oil passage of the bearing member becomes more likely to outflow excessively to the outside of the bearing along the oil grooves. For this reason, the excessive outflow of lubricant oil leads to increase in amount of supplied oil and possibly leads to degradation of oil seal performance.

An object of the present invention is therefore to provide a bearing structure of a turbocharger capable of suppressing the whirl vibration of the rotor shaft due to the oil film formed in the space between each inside surface of the first and second bearing portions of the bearing member and the rotor shaft and also capable of suppressing the excessive outflow of lubricant oil.

The present invention provides a bearing structure of a turbocharger, comprising: a rotor shaft; a bearing housing in which a bearing hole is formed; and a bearing member of a semi-floating type arranged in the bearing hole and supporting the rotor shaft in a rotatable state, wherein the bearing member has a first bearing portion and a second bearing portion spaced at a predetermined interval in an axial direction of the rotor shaft, in an inner periphery thereof, wherein a region between the first bearing portion and the second bearing portion in the inner periphery of the bearing member, and an outer periphery of the rotor shaft constitute an oil passage for supply of lubricant oil to inside surfaces of the first and second bearing portions, wherein a through hole for supply of the lubricant oil to the oil passage is formed in the bearing member, and wherein an oil groove configured to suppress whirl vibration and closed in part is formed in each of the inside surfaces of the first and second bearing portions.

In the present invention, the whirl speed of oil film is reduced and the whirl vibration is suppressed by the oil grooves formed in the respective inside surfaces of the first and second bearing portions of the bearing member. The oil grooves are closed in part, thereby to suppress the excessive outflow of lubricant oil.

The oil grooves may be open on the oil passage side and closed on end sides of the bearing member. When the oil grooves are those open on the oil groove side and closed on the end sides of the bearing member, the lubricant oil is smoothly supplied to the space between each inside surface of the first and second bearing portions and the outer periphery of the rotor shaft to form oil film. This prevents the seizure and suppresses the whirl vibration.

A length in the axial direction of the oil groove may be set to be not less than a half of a length in the axial direction of each of the first and second bearing portions. The whirl vibration is suitably suppressed by the oil grooves the length in the axial direction of which is set to be not less than a half of the length in the axial direction of each bearing portion.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

The preferred embodiments of the present invention will be described below in detail with reference to the accompanying drawings. In the description the same elements or elements with the same functionality will be denoted by the same reference signs, without redundant description.

Figure 1:
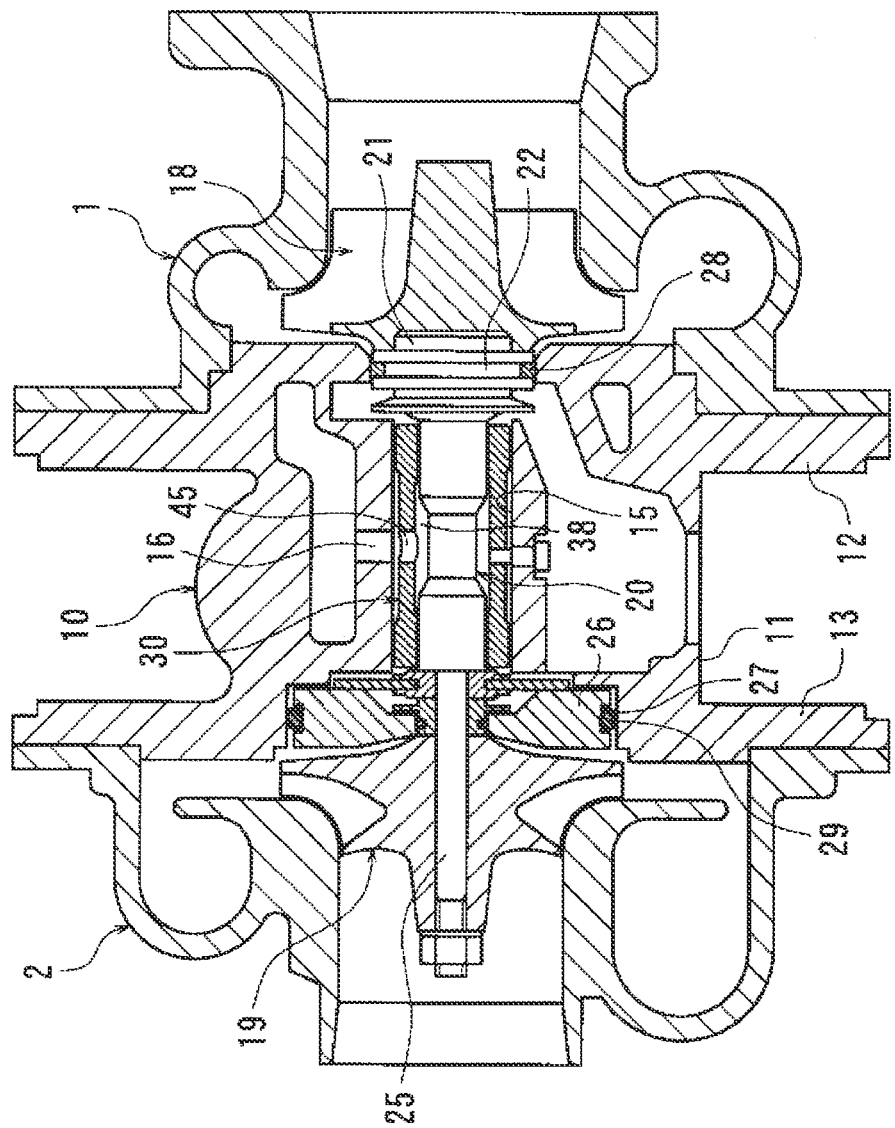
FIG. 1 is a vertical cross-sectional view showing a turbocharger employing a bearing structure according to an embodiment of the present invention.

A bearing structure of a turbocharger according to an embodiment of the present invention will be described with reference to FIGS. 1 to 4. As shown in FIG. 1, the turbocharger is provided with a turbine housing 1, a compressor housing 2, a bearing housing 10, a turbine wheel 18, a compressor impeller 19, and a rotor shaft 20.

The bearing housing 10 has a housing body 11 through a central region of which a bearing hole 15 is formed, a turbine-side flange 12 arranged around the outer periphery at one end of the housing body 11, and a compressor-side flange 13 arranged around the outer periphery at the other end of the housing body 11. The rotor shaft 20 is rotatably incorporated through a bearing member 30 of the semi-floating type, which will be detailed later, in the bearing hole 15 of the housing body 11. A large-diameter axle 21 is formed at one end portion of the rotor shaft 20. The turbine wheel 18 is attached to an end portion of the large-diameter axle 21. A small-diameter axle 25 is formed at the other end portion of the rotor shaft 20. The compressor impeller 19 is attached to the small-diameter axle 25 with a seal ring collar 26 in between. The turbine housing 1 corresponding to the turbine wheel 18 is fastened to the turbine-side flange 12 of the bearing housing 10 with bolts or the like. The compressor housing 2 corresponding to the compressor impeller 19 is fastened to the compressor-side flange 13 with bolts or the like. A seal ring 28 is fitted in an annular groove 22 formed in an outer periphery of the large-diameter axle 21 of the rotor shaft 20. The seal ring 28 is in close contact with an inner periphery of a hole formed outside one end portion of the bearing hole 15 in the housing body 11. A seal ring 29 is fitted in an annular groove 27 formed in an outer periphery of the seal ring collar 26. The seal ring 29 is in close contact with an inner periphery of a hole formed outside the other end portion of the bearing hole 15 in the housing body 11.

Figure 2:
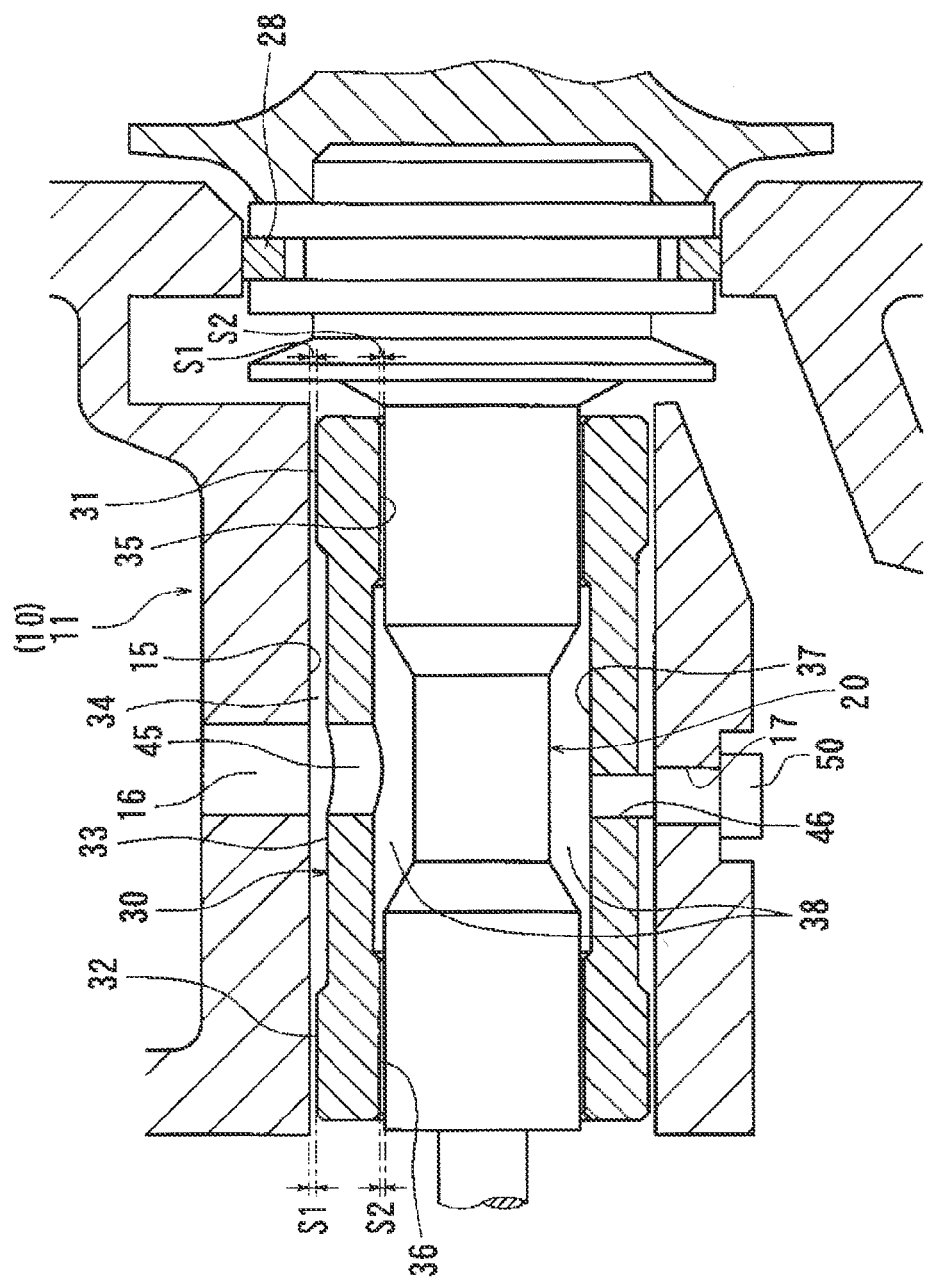
FIG. 2 is a vertical cross-sectional view showing an enlarged view of the bearing structure of the turbocharger.
Figure 3:
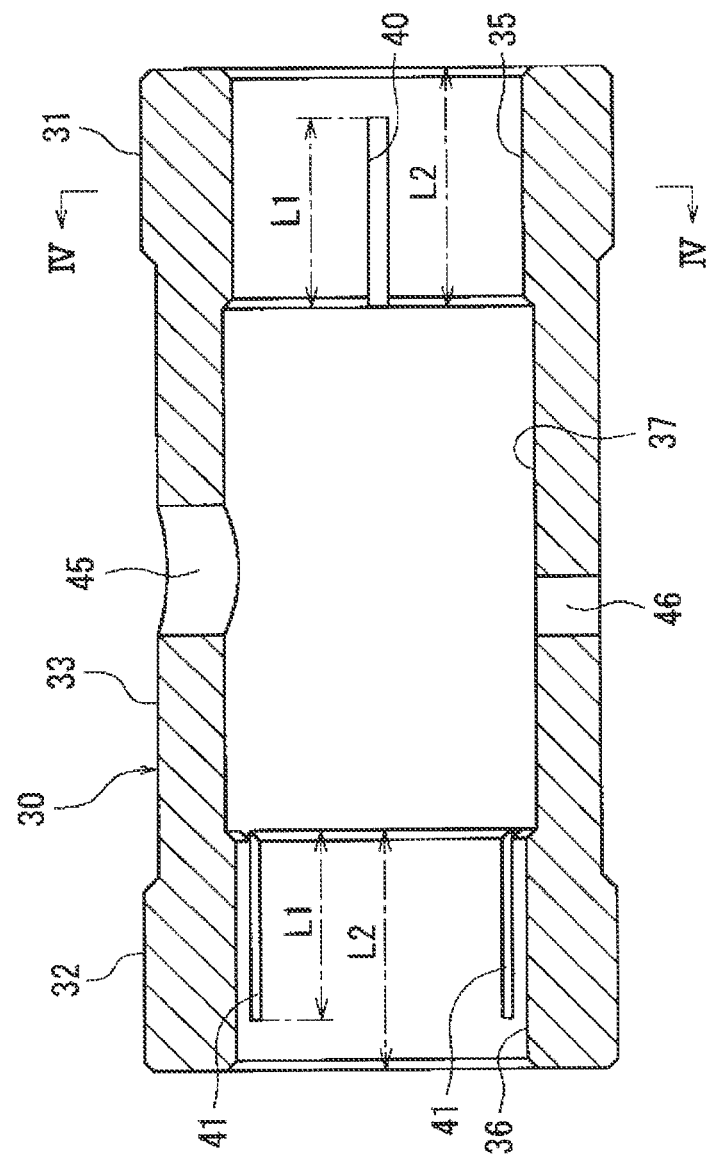
FIG. 3 is a vertical cross-sectional view showing a bearing member alone.

As shown in FIGS. 2 and 3, the bearing member 30 of the semi-floating type is comprised of a metal material (e.g., a copper-based alloy material) or a ceramic material or the like which is used for slide bearings, and is formed in a cylindrical shape. Outside first and second bearing portions 31, 32 are arranged in the outer periphery of the bearing member 30. The first bearing portion 31 and the second bearing portion 32 are spaced at a predetermined interval in the axial direction of the rotor shaft 20 (which will be referred to hereinafter simply as "axial direction"). The first bearing portion 31 and the second bearing portion 32 are fitted each through a small space S1 (e.g., 20-100 μm) to the inner periphery of the bearing hole 15 in the bearing housing 10. Namely, the space S1 is a clearance between each of the first and second bearing portions 31, 32 of the bearing member 30 and the inner periphery of the bearing hole 15 in the bearing housing 10. A small-diameter portion 33 is arranged between the first bearing portion 31 and the second bearing portion 32 in the outer periphery of the bearing member 30. A cylindrical space region between the small-diameter portion 33 and the bearing hole 15 of the bearing housing 10 is an outside oil passage 34. Lubricant oil is supplied through a lubricant supply hole 16 formed in the bearing housing 10, into the outside oil passage 34.

Inside first and second bearing portions 35, 36 are arranged in the inner periphery of the bearing member 30. The first bearing portion 35 and the second bearing portion 36 are spaced at a predetermined interval in the axial direction. The first bearing portion 35 and the second bearing portion 36 are fitted each through a small space S2 similar to the space S1, to the outer periphery of the rotor shaft 20. Namely, the space S2 is a clearance between each of the first and second bearing portions 35, 36 of the bearing member 30 and the outer periphery of the rotor shaft 20. A large-diameter hole portion 37 is arranged between the first bearing portion 35 and the second bearing portion 36 in the inner periphery of the bearing member 30. A cylindrical space region between the large-diameter hole portion 37 and the outer periphery of the rotor shaft 20 is an inside oil passage 38. Namely, the region between the first bearing portion 35 and the second bearing portion 36 in the inner periphery of the bearing member 30, and the outer periphery of the rotor shaft 20 constitute the inside oil passage 38 for supply of the lubricant oil to the inside surfaces of the first and second bearing portions 35, 36. A through hole 45 is formed through the bearing member 30 from the small-diameter portion 33 to the large-diameter hole portion 37. Through the through hole 45, the inside oil passage 38 is in communication with the outside oil passage 34. A pin hole 46 is formed through the bearing member 30 from the small-diameter portion 33 to the large-diameter hole portion 37. An anti-rotation pin 50 is fitted through a pin hole 17 of the bearing housing 10 into the pin hole 46 of the bearing member 30, so as to prevent the bearing member 30 from rotating relative to the bearing housing 10 and from moving in the axial direction.

Figure 4:
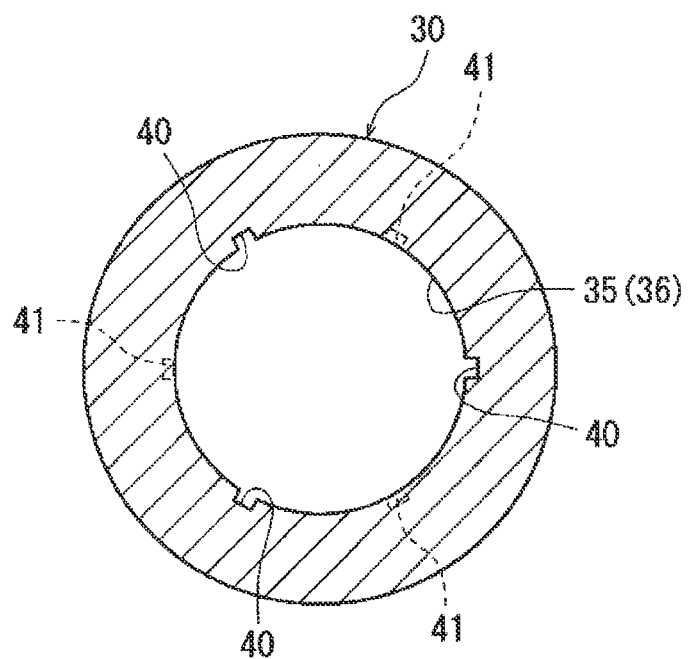
FIG. 4 is a transverse cross-sectional view along the line IV-IV in FIG. 3.

As shown in FIGS. 3 and 4, a plurality of oil grooves 40, 41 are formed in each of the inside surfaces of the first and second bearing portions 35, 36 of the bearing member 30. The oil grooves 40, 41 are parallel to the axial direction and are closed in part. In the present embodiment, the oil grooves 40, 41 are open to the inside oil passage 38 and closed on the two end sides of the bearing member 30. Namely, each oil groove 40, 41 is open at one end to the inside oil passage 38 and closed at the other end in the axial direction. The length L1 of each oil groove 40, 41 in the axial direction is set to be not less than a half of the length L2 of the first and second bearing portions 35, 36 in the axial direction.

In the present embodiment, as shown in FIG. 4, there are three oil grooves 40 in the first bearing portion 35 which are spaced at angles of 120° in the circumferential direction, when viewed from the axial direction. There are also three oil grooves 41 in the second bearing portion 36 which are spaced at angles of 120° in the circumferential direction, when viewed from the axial direction. The oil grooves 40 and the oil grooves 41 are arranged with deviations of 60° in the circumferential direction when viewed from the axial direction. Namely, the oil grooves 40 and the oil grooves 41 are arranged at respective angular positions different from each other, when viewed from the axial direction. This configuration allows the lubricant oil fed into the inside oil passage 38 to be stably supplied to the first bearing portion 35 and second bearing portion 36.

The bearing structure of the turbocharger according to the present embodiment is configured as described above. The lubricant oil fed through the lubricant supply hole 16 in the bearing housing 10 flows into the outside oil passage 34 and then flows into each of the spaces S1 to form oil film. Part of the lubricant oil flowing into the outside oil passage 34 is supplied through the through hole 45 of the bearing member 30 into the inside oil passage 38 and then flows into each of the spaces S2 to form oil film.

The oil grooves 40, 41 are formed in the inside surfaces of the first and second bearing portions 35, 36 of the bearing member 30. These oil grooves 40, 41 decrease the whirl speed of oil film so as to suppress the whirl vibration, while preventing the seizure of the rotor shaft 20. Since the oil grooves 40, 41 are closed in part, it is feasible to suppress the excessive outflow of the lubricant oil. For this reason, there is no need for increase in amount of supplied oil. Furthermore, since an excess of outflowing lubricant oil is prevented from scattering toward the seal ring 28, there is no degradation of oil seal performance. If the oil grooves are formed throughout the entire length in the axial direction of the first and second bearing portions 35, 36 in order to prevent the whirl vibration, an excess of lubricant oil will flow along the oil grooves. For this reason, it becomes necessary to increase a supply amount of lubricant oil. In contrast to it, there is no need for increase in supply amount of oil in the present embodiment because the oil grooves 40, 41 are closed in part.

In the present embodiment, the oil grooves 40, 41 are open to the inside oil passage 38 and closed on the two end sides of the bearing member 30. This configuration allows the lubricant oil to be smoothly supplied into the spaces S2 to form the oil film, and suppresses the whirl vibration. Since the length L1 of each oil groove 40, 41 in the axial direction is set to be not less than a half of the length L2 of the first and second bearing portions 35, 36 in the axial direction, it is feasible to suitably suppress the whirl vibration.

Figure 5:
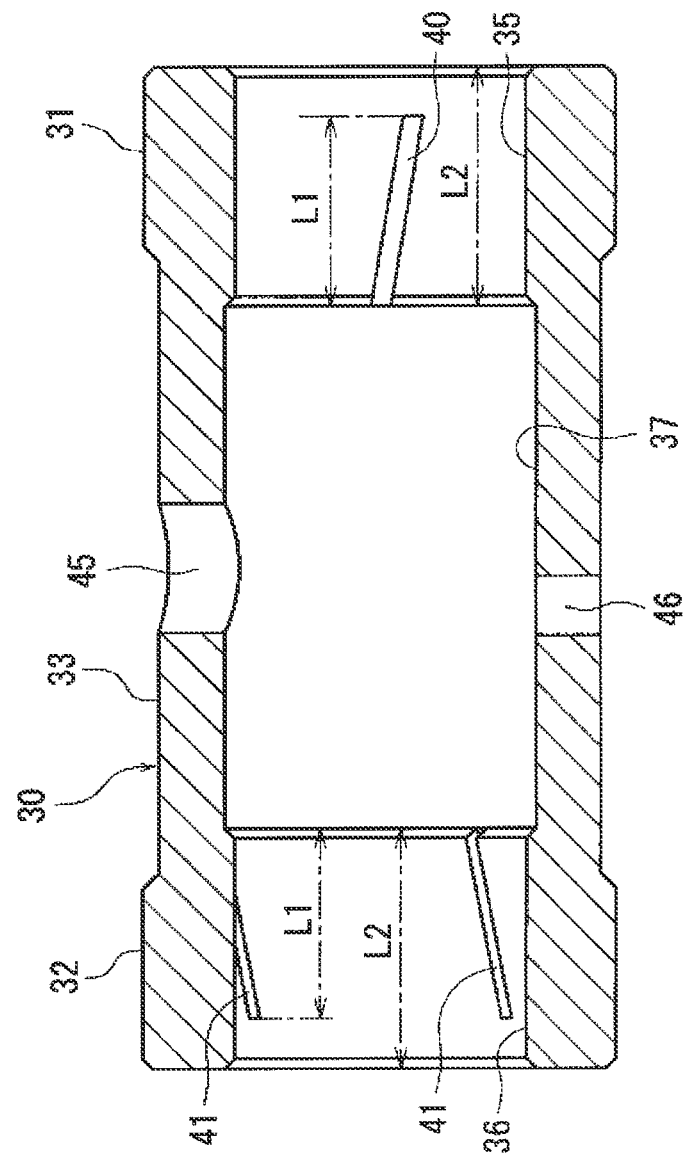
FIG. 5 is a vertical cross-sectional view showing an embodiment in which oil grooves of the bearing member are formed with an inclination relative to the axial direction.

It should be noted that the present invention is by no means limited to the above-described embodiment and can be carried out in a variety of forms, within the scope not departing from the scope and spirit of the invention. For example, the above embodiment showed the mode in which the plurality of oil grooves 40, 41 were formed in the respective inside surfaces of the first and second bearing portions 35, 36 of the bearing member 30, but the numbers of oil grooves 40, 41 each may be one. The oil grooves 40, 41 were formed in parallel with the axial direction in the above embodiment, but they may be formed with an inclination relative to the axial direction as shown in FIG. 5. The oil grooves 40, 41 may be formed with such an inclination that the lubricant oil flowing into the oil grooves 40, 41 returns to the large-diameter hole portion 37. In this case, even if the lubricant oil drags to whirl with rotation of the rotor shaft 20, it is feasible to further prevent the outflow of lubricant oil. In FIG. 5, the direction of rotation of the rotor shaft 20 is the clockwise direction when viewed along the axial direction from the compressor housing 2 side.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A bearing structure of a turbocharger, comprising:
   a rotor shaft;
   a bearing housing in which a bearing hole is formed; and
   a bearing member of a semi-floating type, formed in a generally cylindrical shape, arranged in the bearing hole and supporting the rotor shaft in a rotatable state,
   wherein the bearing member has a first bearing portion and a second bearing portion spaced at a predetermined interval in an axial direction of the rotor shaft, in an inner periphery thereof,
   wherein a region between the first bearing portion and the second bearing portion in the inner periphery of the bearing member, and an outer periphery of the rotor shaft constitute an oil passage for supply of lubricant oil to inside surfaces of the first and second bearing portions,
   wherein a through hole for supply of the lubricant oil to the oil passage is formed in the bearing member, and
   wherein an oil groove configured to suppress whirl vibration and closed in part is formed in each of the inside surfaces of the first and second bearing portions,
   wherein a first end of each of the oil grooves is open at the oil passage and an opposite second end of each of the oil grooves is closed, so that a length of each of the oil grooves, respectively, is less than a length of the inside surfaces of the first and second bearing portions, respectively, as measured along the axial direction of the rotor shaft.

2. The bearing structure of the turbocharger according to claim 1,
   wherein the length of the oil groove in the axial direction is set to be not less than a half of a length of each of the first and second bearing portions in the axial direction.

3. The bearing structure of the turbocharger according to claim 1,
   wherein the oil groove is formed in parallel with the axial direction or with an inclination relative to the axial direction.

4. The bearing structure of the turbocharger according to claim 1,
   wherein a plurality of said oil grooves are formed in each of the inside surfaces of the first and second bearing portions.

5. The bearing structure of the turbocharger according to claim 4,
   wherein the plurality of oil grooves are arranged at equal intervals when viewed from the axial direction.

6. The bearing structure of the turbocharger according to claim 4,
   wherein the plurality of oil grooves formed in the inside surface of the first bearing portion and the plurality of oil grooves formed in the inside surface of the second bearing portion are arranged at respective angular positions different from each other, when viewed from the axial direction.

7. A bearing structure of a turbocharger, comprising:
   a rotor shaft;
   a bearing housing in which a bearing hole is formed; and
   a bearing member of a semi-floating type arranged in the bearing hole and supporting the rotor shaft in a rotatable state,
   wherein the bearing member has a first bearing portion and a second bearing portion spaced at a predetermined interval in an axial direction of the rotor shaft, in an inner periphery thereof,
   wherein a region between the first bearing portion and the second bearing portion in the inner periphery of the bearing member, and an outer periphery of the rotor shaft constitute an oil passage for supply of lubricant oil to inside surfaces of the first and second bearing portions,
   wherein a through hole for supply of the lubricant oil to the oil passage is formed in the bearing member, and
   wherein an oil groove closed in part is formed in parallel with the axial direction or with an inclination relative to the axial direction in each of the inside surfaces of the first and second bearing portions,
   wherein a first end of each of the oil grooves is open at the oil passage and an opposite second end of each of the oil grooves is closed, so that a length of each of the oil grooves, respectively, is less than a length of the inside surfaces of the first and second bearing portions, respectively, as measured along the axial direction of the rotor shaft.

8. The bearing structure of the turbocharger according to claim 7,
  wherein a length of the oil groove in the axial direction is set to be not less than a half of a length of each of the first and second bearing portions in the axial direction.

9. The bearing structure of the turbocharger according to claim 7,
  wherein a plurality of said oil grooves are formed in each of the inside surfaces of the first and second bearing portions.

10. The bearing structure of the turbocharger according to claim 9,
  wherein the plurality of oil grooves are arranged at equal intervals when viewed from the axial direction.

11. The bearing structure of the turbocharger according to claim 9,
  wherein the plurality of oil grooves formed in the inside surface of the first bearing portion and the plurality of oil grooves formed in the inside surface of the second bearing portion are arranged at respective angular positions different from each other, when viewed from the axial direction.

\* \* \* \* \*